United States Patent
Yamamoto et al.

(10) Patent No.: US 10,118,840 B2
(45) Date of Patent: Nov. 6, 2018

(54) CENTRIFUGAL SOLID-LIQUID SEPARATION DEVICE AND WATER TREATMENT DEVICE USING SAME

(71) Applicant: PANASONIC INTELLECTUAL PROPERTY MANAGEMENT CO., LTD., Osaka (JP)

(72) Inventors: Hiroshi Yamamoto, Osaka (JP); Akiyoshi Edagawa, Hyogo (JP); Masafumi Sasai, Osaka (JP); Takuya Kotanagi, Osaka (JP); Hirohumi Minami, Osaka (JP); Hideki Nagaoka, Nara (JP); Masafumi Nishimoto, Aichi (JP); Takashi Sakakibara, Aichi (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 196 days.

(21) Appl. No.: 15/117,860

(22) PCT Filed: Oct. 17, 2014

(86) PCT No.: PCT/JP2014/005280
§ 371 (c)(1),
(2) Date: Aug. 10, 2016

(87) PCT Pub. No.: WO2015/121904
PCT Pub. Date: Aug. 20, 2015

(65) Prior Publication Data
US 2016/0355413 A1    Dec. 8, 2016

(30) Foreign Application Priority Data
Feb. 14, 2014  (JP) .................... 2014-026667

(51) Int. Cl.
*C02F 1/38* (2006.01)
*B01D 21/26* (2006.01)
(Continued)

(52) U.S. Cl.
CPC .............. *C02F 1/38* (2013.01); *B01D 21/267* (2013.01); *B04C 5/28* (2013.01); *B04C 9/00* (2013.01);
(Continued)

(58) Field of Classification Search
CPC ..... C04C 5/28; C04C 9/00; C02F 1/38; C02F 1/4674; C02F 1/48; B01D 17/0217; B01D 21/26; B63J 4/002
(Continued)

(56) References Cited

U.S. PATENT DOCUMENTS

2014/0048467 A1\*  2/2014  Matsuura ................. B01D 1/14
                                                210/175

FOREIGN PATENT DOCUMENTS

JP    31-5453     7/1956
JP    32-9992    11/1957
(Continued)

OTHER PUBLICATIONS

Horizoe et al, JP2008188506, English Machine Translation, pp. 1-8 (Year: 2008).*
(Continued)

*Primary Examiner* — Claire A Norris
(74) *Attorney, Agent, or Firm* — Greenblum & Bernstein, P.L.C.

(57) ABSTRACT

When a plurality of cyclones are used as a separation device of a water treatment device, there have been as many lower liquid containers as the number of cyclones, resulting in high cost. Provided is a centrifugal solid-liquid separation device including: a plurality of cyclones respectively having at least
(Continued)

a liquid inlet, a liquid outlet, and a lower liquid port; and a lower liquid container communicating with the respective lower liquid ports of the plurality of cyclones via pipes, arranged below the plurality of cyclones, and having a drain hole in its bottom side. The lower liquid container includes a space forming portion above lower opening ends of the pipes. Also provided is a water treatment device using this centrifugal solid-liquid separation device.

9 Claims, 8 Drawing Sheets (51) Int. Cl.
C02F 1/467 (2006.01)
B63J 4/00 (2006.01)
B04C 5/28 (2006.01)
B04C 9/00 (2006.01)
C02F 103/00 (2006.01)

(52) U.S. Cl.
CPC .............. *B63J 4/002* (2013.01); *C02F 1/4674* (2013.01); *C02F 2103/008* (2013.01)

(58) Field of Classification Search
USPC .................................. 210/748.2, 760, 512.2
See application file for complete search history.

(56) References Cited

FOREIGN PATENT DOCUMENTS

| JP | 34-6794 | 8/1959 | | |
|----|---------|--------|---|---|
| JP | 59-500703 | 4/1984 | | |
| JP | 2008-188506 | 8/2008 | | |
| JP | 2009-274028 | 11/2009 | | |
| JP | 2012-192402 | 10/2012 | | |
| WO | 83/03369 | 10/1983 | | |
| WO | 2005/077833 | 8/2005 | | |
| WO | WO-2012105654 A | * | 8/2012 | ............... B01D 1/14 |
| WO | 2012/124039 | 9/2012 | | |

OTHER PUBLICATIONS

Hayami et al, JP 2012192402, English Machine Translation, pp. 1-16 (Year: 2012).*

Japanese Office Action for JP App. No. 2014-026667 dated Jul. 25, 2017.

International Search Report issued in International Application No. PCT/JP2014/005280, dated Jan. 13, 2015, along with English-language translation thereof.

Written Opinion issued in International Application No. PCT/JP2014/005280, dated Jan. 13, 2015, along with English-language translation thereof.

* cited by examiner

CENTRIFUGAL SOLID-LIQUID SEPARATION DEVICE AND WATER TREATMENT DEVICE USING SAME

FIELD

The present invention relates to a centrifugal solid-liquid separation device which separates microorganisms from a liquid to be treated that is taken into a ship as ballast water from a water area of a port of call, and a water treatment device using the same.

BACKGROUND

Ships are designed so that when loaded, they can be sank enough to secure an appropriate draft and stabilized, with their propeller screw also under water. Accordingly when not loaded, ships are floated up by buoyancy too much to be stabilized or to secure a submersing depth of the propeller screw. Unloaded cargo ships and the like therefore take in the liquid to be treated at the port of call and store the liquid to be treated in the hull so as to have a height of the waterline close to that in a loaded state. The liquid to be treated taken in as above is called ballast water.

Ballast water is transported to the next port of call as a "weight" of the ship, and released when cargoes are loaded. In other words, marine organisms in the previous port of call can be brought to the next port of call. Transplanting organisms from one place to another place is likely to result in destruction or contamination of ecosystems grown by Mother Nature in the latter place. Therefore the International Maritime Organization (IMO) has adopted the Ballast Water Convention (International Convention for the Control and Management of Ships' Ballast Water and Sediments) which defines standards for an amount of organisms included in ballast water to be discharged.

According to the standards, the number of organisms of 50☐m or greater (mostly zooplankton) included in 1 m³ of ballast water discharged from a ship must be less than 10. The number of organisms of greater than or equal to 10 ☐m and smaller than 50 ☐m (mostly phytoplankton) in 1 mL must be less than 10. The number of cholera bacilli in 10 mL must be less than 1 cfu. The number of *Escherichia coli* in 100 mL must be less than 250 cfu. The number of Enterococci in 100 mL must be less than 100 cfu. Here, "cfu" stands for colony forming unit.

To meet the standards, a lot of techniques related to ballast water treatment have recently been disclosed. Specific examples include a method for removing aquatic organisms by filtration, centrifugal separation, etc., a method for physically or mechanically killing aquatic organisms, a method for thermally killing aquatic organisms, and a method for injecting chemicals into the ballast tank or generating chlorine-based substance and the like to kill aquatic organisms.

Figure 8:
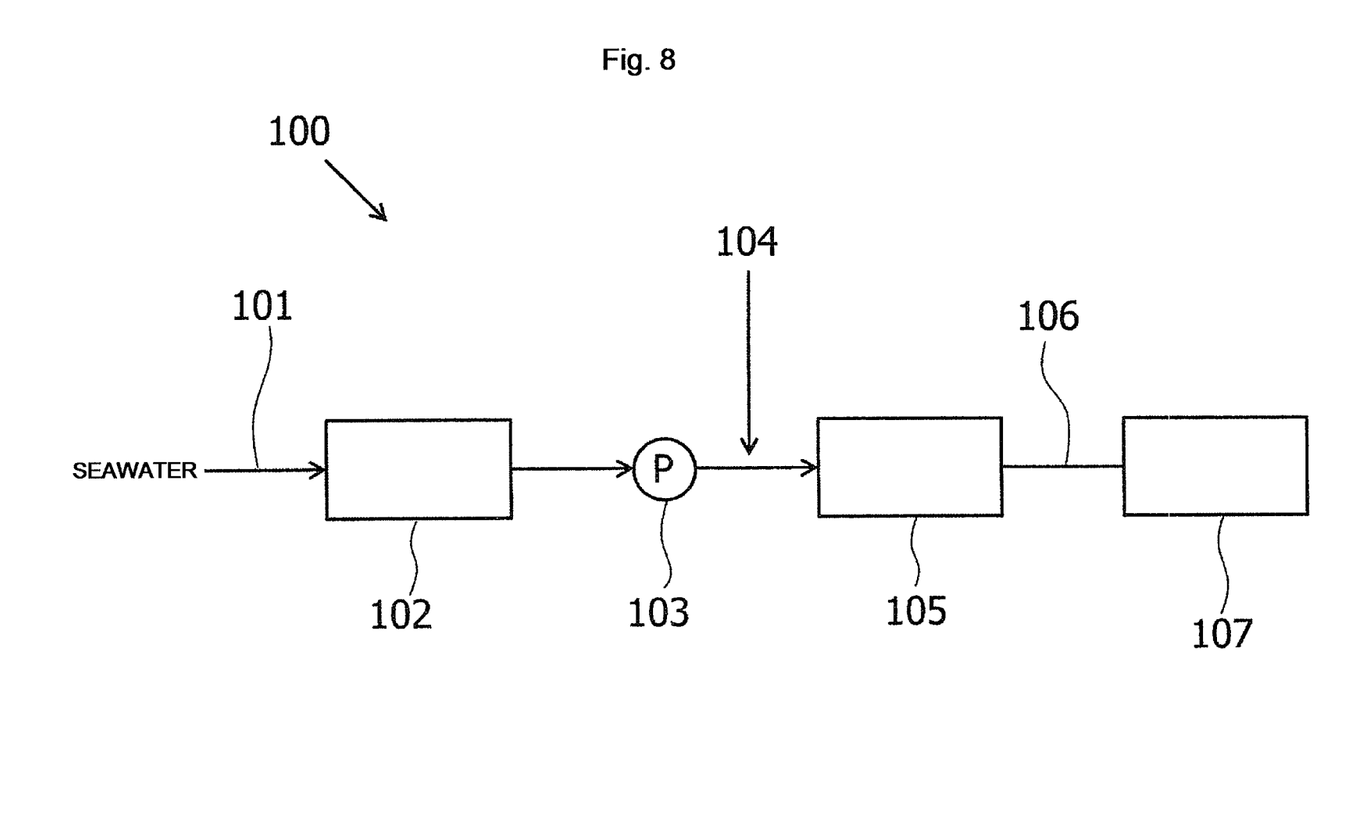
FIG. 8 is a diagram showing a configuration of a more detailed conventional example of the water treatment device.

The method for removing aquatic organisms by centrifugal separation is free of problems of filter clogging and the like, effective at separating aquatic organisms having certain specific gravities, and is used in combination with other methods. FIG. 8 shows a water treatment device 100 disclosed in Patent Literature 1.

This water treatment device 100 includes a seawater intake line 101, a rough filtration device 102 which is provided with a hydro-cyclone for removing large objects from the seawater taken in, a pump 103 which serves as a ballast water supply device for conveying the seawater, a disinfectant supply device 104 which supplies a disinfectant for killing filtered microorganism and bacteria, a retention tank 105 which retains the disinfectant-added seawater for a predetermined time, a treated water conveyance line 106 which conveys the treated water led out of the retention tank 105, and a ballast tank 107 which stores the treated water conveyed from the treated water conveyance line 106.

Patent Literature 1 does not disclose a detailed configuration of the rough filtration device (hereinafter, referred to as a "centrifugal solid-liquid separation device") 102. However, the configuration of FIG. 7 has been known for a centrifugal solid-liquid separation device.

Figure 7:
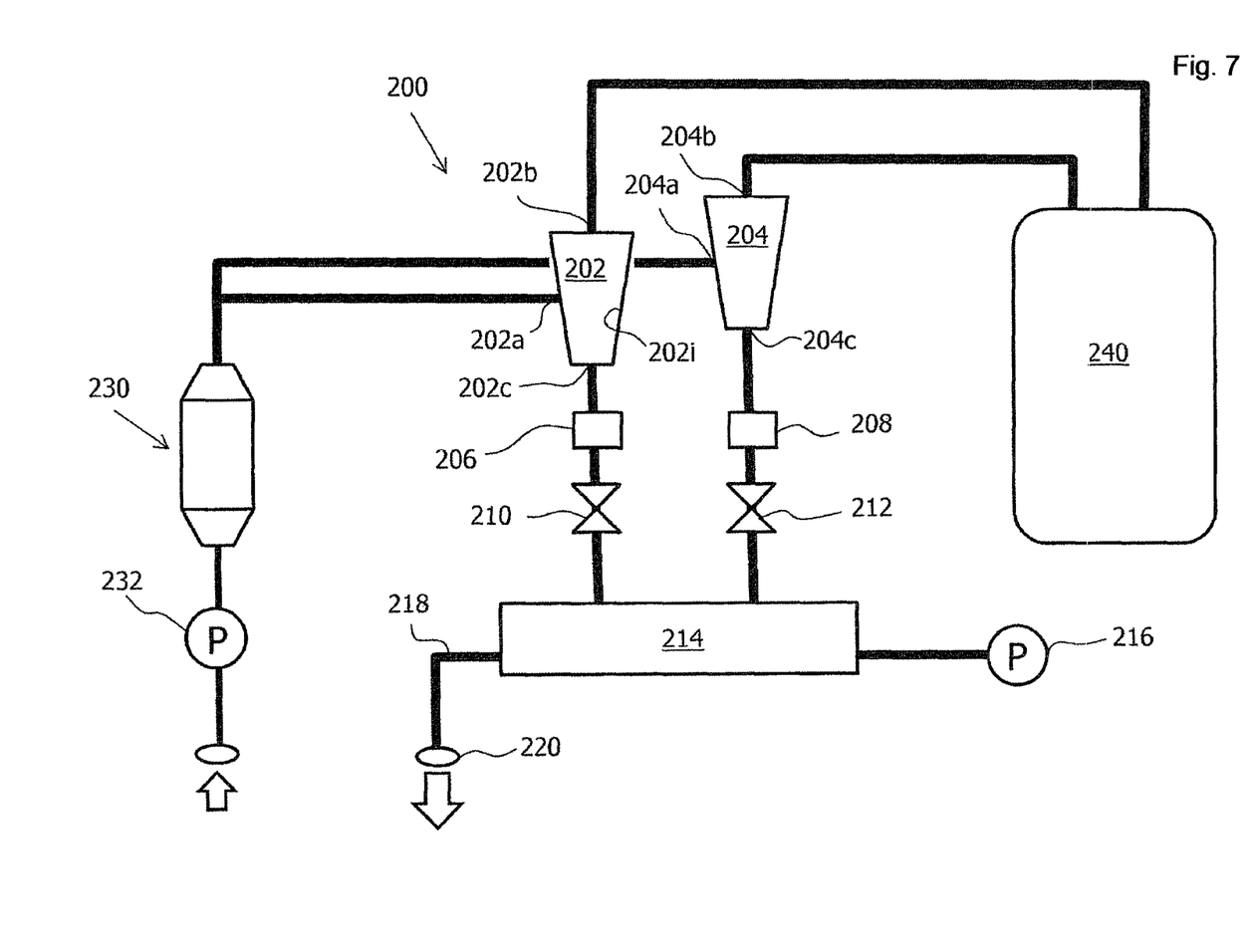
FIG. 7 is a diagram showing a configuration of a conventional example of a water treatment device.

Referring to FIG. 7, a centrifugal solid-liquid separation device 200 includes a plurality of cyclones 202 and 204, lower liquid containers 206 and 208 which are arranged under the cyclones 202 and 204, valves 210 and 212 which are arranged under the lower liquid containers 206 and 208, and a storage container 214 which is provided under the valves 210 and 212. A flushing pump 216 is arranged in an upstream side of the storage container 214. The storage container 214 is connected to a discharge port 220 of the hull via a drain pipe 218 in the downstream side of the storage container 214.

The cyclones 202 and 204 include liquid inlets 202*a* and 204*a*, liquid outlets 202*b* and 204*b*, and lower liquid ports 202*c* and 204*c*. A water intake pump 232 and an inactivation device 230 are arranged in an upstream side of the centrifugal solid-liquid separation device 200. A treated liquid storage tank 240 is arranged in a downstream side of the centrifugal solid-liquid separation device 200.

An operation of the cyclones 202 and 204 will be described by using the cyclone 202 as an example. When operating the cyclone 202, the valve 210 is closed to fill the lower liquid container 206 with a liquid to be treated. The liquid to be treated taken into the hull passes through the inactivation device 230 and flows into the cyclone 202 through the liquid inlet 202*a*. The cyclone 202 has an inverted circular truncated cone shape, and its inner surface 202*i* has a downward inclined surface. The liquid to be treated flowing into the cyclone 202 through the liquid inlet 202*a* swirls along the inner surface 202*i* of the cyclone 202.

During swirling, aquatic organisms having high specific gravities move down along the inclined surface of the inner surface 202*i* and fall through the lower liquid port 202*c* into the lower liquid container 206. Meanwhile, water components of the liquid to be treated are taken out of the liquid outlet 202*b* and conveyed to the treated liquid storage tank 240. When a certain amount of aquatic organisms are accumulated in the lower liquid container 206, the aquatic organisms and the liquid to be treated are discharged into the storage container 214 via the valve 210 below.

The storage container 214 is a pipe having a rather large capacity, and can store a certain amount of aquatic organisms as well as trash, organic substances, inorganic substances and other minerals and hydroxides (such as calcium hydroxide and magnesium hydroxide) (hereinafter, referred to as "aquatic organisms and the like").

The flushing pump 216 is used to flush water through the storage container 214 when the amount of the liquid to be treated in the storage container 214 reaches or exceeds a certain amount, or at regular time intervals. The aquatic organisms and the like are discharged out of the hull via the drainpipe 218 and the drain port 220, when the valves 210 and 212 are closed so as not to allow the aquatic organisms and the like in the storage container 214 to flow back.

CITATION LIST

Patent Literature

Patent Literature 1: International Publication No. 2012/124039

SUMMARY

Technical Problem

A cyclone-based centrifugal solid-liquid separation device is useful as the device is almost free of clogging, and can be used with less maintenance work when used with a device for killing organisms (inactivation device). When the centrifugal solid-liquid separation device is installed in a ship, the installation space in the hull is limited. In particular, to obtain a predetermined separation effect (separation capacity per unit time) within a height limit, a plurality of small-sized cyclones need to be installed.

Conventionally, the plurality of cyclones are provided with respective lower liquid containers, valves, and accompanying pipes. To control such components, a complicated control system needs to be provided. In addition, such a configuration increases the numbers of lower liquid containers and valves, causing an increase in cost. There is also a problem of using more of a limited inboard space. To solve these problems, it may be an idea to use one lower liquid container in common.

However, the plurality of cyclones, even if manufactured in the same way, do not generate the same hydraulic pressure at the lower liquid ports because of difference in lengths among piping arrangements and a manufacturing margin of error. This causes a problem that the liquid to be treated flows back to the cyclone having the lowest hydraulic pressure at the lower liquid port among the plurality of cyclones. This means that aquatic organisms and the like separated from the liquid to be treated are returned to the cyclone.

There has also been a problem that in case of arranging a disinfectant supply device for the inactivation device as per Patent Literature 1, maintenance work of supplying a disinfectant is needed.

Solution to Problem

In view of the foregoing problems, the present invention provides a centrifugal solid-liquid separation device having a structure in which a common lower liquid container is provided for a plurality of cyclones without causing backflow of the liquid to be treated among the cyclones. More specifically, the centrifugal solid-liquid separation device includes:

a plurality of cyclones respectively having at least a liquid inlet, a liquid outlet, and a lower liquid port; and a lower liquid container that communicates with each of the lower liquid ports of the plurality of cyclones, wherein the lower liquid container is provided with a space forming portion above communication opening ends for the respective lower liquid ports of the plurality of cyclones.

A water treatment device including an inactivation device that applies a voltage between opposed electrodes to pass an electric current arranged before a centrifugal solid-liquid separation device in a treatment process is also provided. More specifically, the water treatment device includes:

a water intake pipe that is connected to a water intake port;

an inactivation device that has a water inlet connected to the water intake pipe;

a pipe that is connected to a water outlet of the inactivation device and branches into a plurality of pipes; and the centrifugal solid-liquid separation device in which the pipes are connected to respective liquid inlets.

Advantageous Effects of Invention

As the centrifugal solid-liquid separation device according to the present invention includes only one lower liquid container for the plurality of cyclones, materials to be used can be reduced. As a result, the centrifugal solid-liquid separation device according to the present invention can be achieved in a smaller size and at lower cost. The number of valves between the cyclones and the storage container may be equal to the number of cyclones or less (at least one), which simplifies the control system.

Despite the lower liquid container commonly provided for the plurality of cyclones, separated water does not flow back to the each cyclone.

As the inactivation device for applying a voltage between the opposed electrodes to pass an electric current is arranged before the centrifugal solid-liquid separation device in the treatment process, a water treatment device with less maintenance work can be provided in a compact size.

DESCRIPTION OF EMBODIMENTS

A centrifugal solid-liquid separation device according to the present invention and a water treatment device using the same will be described below with reference to the drawings. The following embodiments are mere exemplary embodiments of the present invention, and the present invention is not limited to the following description. Modifications may be made to the following embodiments without departing from the gist of the present invention. As employed herein, "liquid to be treated" includes seawater, fresh water, and a mixture of seawater and fresh water. The liquid to be treated may contain aquatic organisms and the like. A liquid obtained in a last treatment process by the water treatment device according to the present invention will be referred to as a "treated liquid." The treated liquid is the liquid to be treated on which a treatment for killing aquatic organisms has been performed and a treatment for separating aquatic organisms and the like has been performed.

(Embodiment 1)

Figure 1:
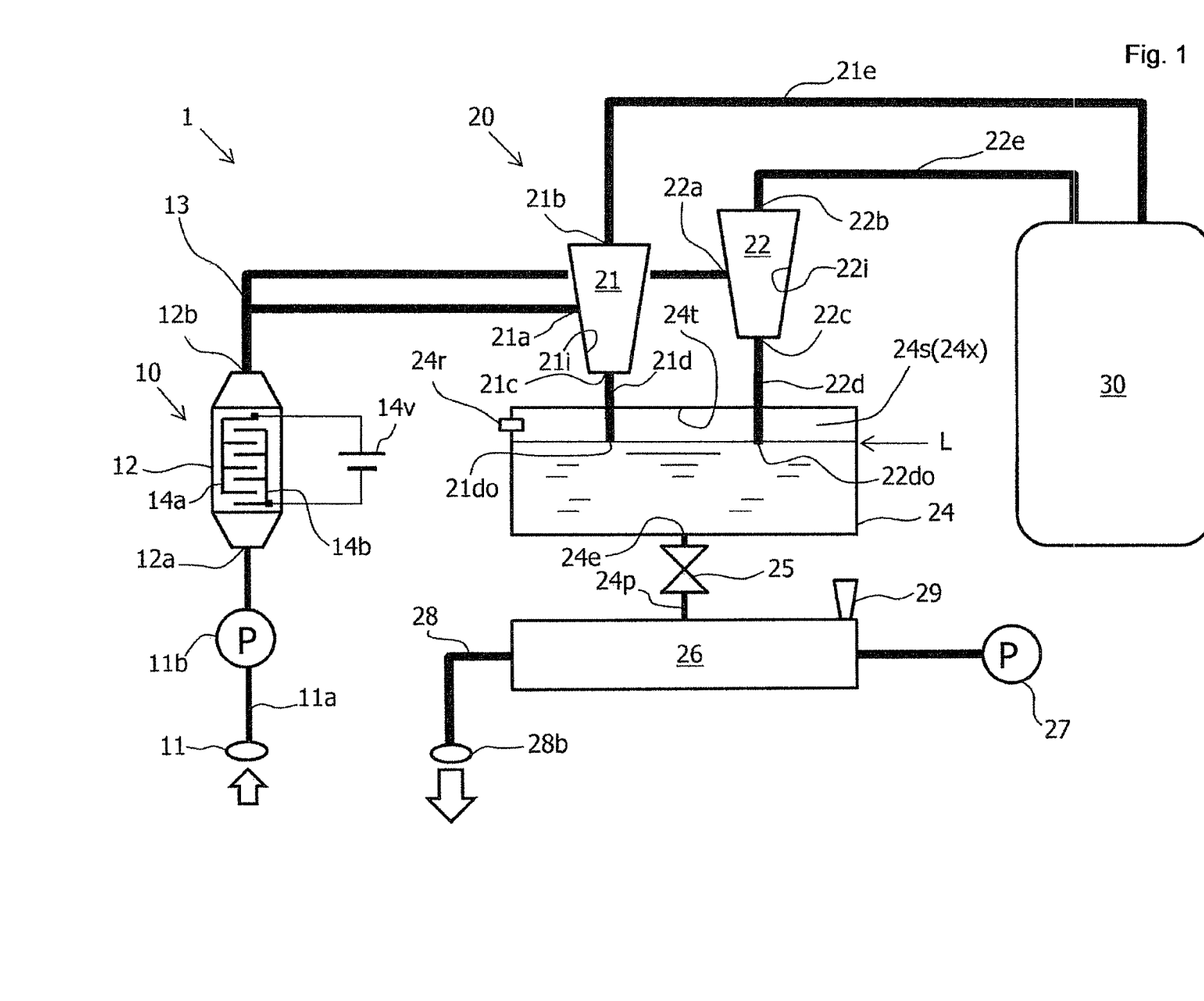
FIG. 1 is a diagram showing a configuration of a water treatment device according to the present invention.

FIG. 1 shows a configuration of a water treatment device 1 according to the present embodiment. The water treatment device 1 includes an inactivation device 10 and a centrifugal solid-liquid separation device 20. A water inlet 12a of a main body 12 of the inactivation device 10 is connected to a water intake pipe 11a extending from a water intake port 11 of the hull. A water intake pump 11b is arranged in the water intake pipe 11a. A pipe 13 is connected to a water outlet 12b of the main body 12.

The centrifugal solid-liquid separation device 20 includes a plurality of cyclones 21 and 22 and a lower liquid container 24. The centrifugal solid-liquid separation device 20 may also include a valve 25 arranged under the lower liquid container 24, a storage container 26, a flushing pump 27, and a drain pipe 28. The number of cyclones is not limited in particular as long as it is two or more. A case with two cyclones will be described here. A process of separating aquatic organisms and the like from the liquid to be treated by the centrifugal solid-liquid separation device 20 will be referred to as separation treatment.

As the inactivation device 10, a kind of a device capable of applying a voltage between opposed electrodes 14a and 14b with a power supply 14v is arranged. Unlike the case of using a disinfectant, this reduces time and labor for maintenance. The inactivation device 10 itself can also be reduced in size. The pipe 13 connected to the water outlet 12b of the inactivation device 10 branches off on the way toward liquid inlets 21a and 22a of the cyclones 21 and 22 of the centrifugal solid-liquid separation device 20. A process of killing aquatic organisms and the like by the inactivation device 10 will be referred to as killing treatment.

Lower liquid ports 21c and 22c of the cyclones 21 and 22 communicate with the lower liquid container 24 via pipes 21d and 22d. No valve is arranged in the pipes 21d and 22d. Liquid outlets 21b and 22b of the cyclones 21 and 22 are respectively connected with pipes 21e and 22e at one end thereof. The other ends of the pipes 21e and 22e are connected to a treated liquid storage tank 30. The treated liquid storage tank 30 may be a ballast tank or other equipment.

The lower liquid container 24 has a drain hole 24e on its drain side. An openable and closable air vent 24r may be arranged in an upper part. Communication open ends 21do and 22do of the pipes 21d and 22d in the lower liquid container 24 are located below a ceiling 24t of the lower liquid container 24.

One of features in the centrifugal solid-liquid separation device 20 according to the present embodiment is that an air space 24s is secured in the lower liquid container 24 common to the plurality of cyclones 21 and 22 from the ceiling 24t of the lower liquid container 24 down to the communication opening ends 21do and 22do of the pipes 21d and 22d.

The drain hole 24e is connected with a communication member 24p. The communication member 24p is connected to the storage container 26. The communication member 24p is provided with the valve 25.

The storage container 26 takes in aquatic organisms and the like precipitated in the lower liquid container 24 to discharge the same. A pipe-like container can be suitably used when the aquatic organisms and the like are to be discharged by flushing water. The shape of the storage container 26 is not limited in particular as long as the precipitated aquatic organisms and the like can be stored. The storage container 26A may be provided with a neutralization device 29.

When the inactivation device 10 is the kind of the device using the opposed electrodes 14a and 14b, the liquid to be treated after passing through the inactivation device 10 contains hypochlorous acid. The neutralization device 29 is provided to neutralize the hypochlorous acid before the liquid to be treated in the storage container 26 is discharged. Specifically, a device for injecting sodium thiosulfate into the storage container 26 can be suitably used.

The flushing pump 27 may be connected to the storage container 26 in the upstream side. The purpose is to discharge the liquid to be treated in the storage container 26 by flushing water. The drain pipe 28 is connected to the storage container 26 in the downstream side. A downstream end 28b of the drain pipe 28 is a drain port open to outside the ship.

Next, an operation of the water treatment device 1 according to the present embodiment will be described. Here, a description will be given by taking a case in which the water treatment device 1 stores the treated liquid in the treated liquid storage tank 30 for example. When the treated liquid is stored in the treated liquid storage tank 30, the liquid to be treated is taken in through the water intake port 11 formed in the outer surface of the hull via the water intake pump 11b. The liquid to be treated taken in is passed through the water intake pipe 11a to enter the inactivation device 10. The valve 25 of the communication member 24p connected to the drain hole 24e of the lower liquid container 24 is closed. The air vent 24r may usually be closed.

In the inactivation device 10, a voltage is applied between the opposed electrodes 14a and 14b to pass an electric current. The liquid to be treated is electrolyzed between the opposed electrodes 14a and 14b. Accordingly, the anode generates chlorine gas, which is dissolved to produce hypochlorous acid. The organisms can be killed with the hypochlorous acid.

The liquid to be treated coming out of the water outlet 12b of the inactivation device 10 is passed through the pipe 13 and injected into the cyclones 21 and 22 through the liquid inlets 21a and 22a.

The lower liquid ports 21c and 22c of the cyclones 21 and 22 directly communicate with the lower liquid container 24. The liquid to be treated thus falls into the lower liquid container 24. After the water level L of the lower liquid container 24 rises and the water level L reaches the communication opening ends 21do and 22do of the pipes 21d and 22d of the cyclones 21 and 22, the water level L does not rise any further. That is, the interior of the lower liquid container 24 is divided into a space for the liquid to treated up to the communication opening ends 21do and 22do and the air space 24s from the communication opening ends 21do and 22do to the ceiling 24t.

The liquid to be treated flows continuously into the cyclones 21 and 22 through the liquid inlets 21a and 22a, and The cyclones 21 and 22 are thus filled with the liquid to be treated which is discharged through the liquid outlets 21b and 22b as a treated liquid. At this time, the liquid to be treated swirls along the inclined inner surfaces 21i and 22i in the cyclones 21 and 22. The aquatic organisms and the like having such specific gravities as to be pressed against the inclined inner surfaces 21i and 22i by the centrifugal force of swirl move downward while swirling along the inner surfaces 21i and 22i, pass through the lower liquid ports 21c and 22c and the pipes 21d and 22d, and fall into the lower liquid container 24. Capability of the cyclones 21 and 22 for separation with respect to magnitude of the specific gravity may be referred to as the "sizing characteristics of the cyclones."

The aquatic organisms and the like may include organisms and bacteria to be regulated by the Ballast Water Convention, and may include dead bodies thereof.

The treated liquid itself is discharged out of the cyclones 21 and 22 through the liquid outlets 21b and 22b and stored in the treated liquid storage tank 30.

Figure 2:
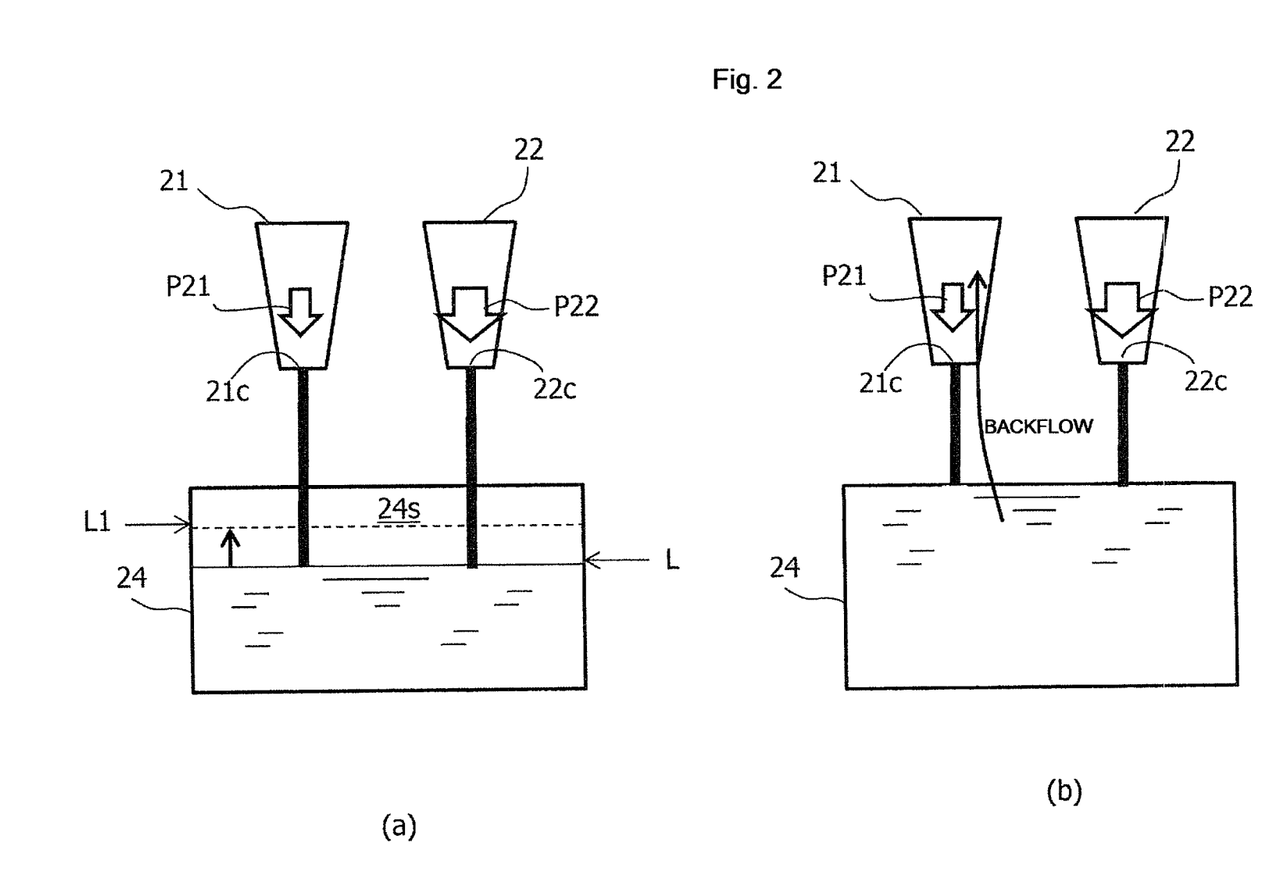
FIG. 2 is a diagram showing in (a) and (b) only cyclones and a lower liquid container.

FIG. 2(a) shows only the cyclones 21 and 22 and the lower liquid container 24. Suppose that there is a difference in pressure between the lower liquid ports 21c and 22c of the cyclones 21 and 22, and that pressure P22 at the lower liquid port 22c is higher than pressure P21 at the lower liquid port 21c. Then, the water level L in the lower liquid container 24 is raised. In FIG. 2, the water level after being raised is represented by "L1." In spite of the above, the liquid to be treated in the lower liquid container 24 does not flow back into the cyclone 21. The reason is that the air space 24s in the lower liquid container 24 decreases in volume to absorb the increase of the pressure P22 at the lower liquid port 22c.

In contrast, suppose that as shown in FIG. 2(b), the entire lower liquid container 24 is filled with the liquid to be treated without the air space 24s. FIG. 2(b) shows that the water level L has been raised to the ceiling 24t. Such a situation can occur when the communication opening ends 21do and 22do of the pipes 21d and 22d from the cyclones 21 and 22 are flush with the surface of the ceiling 24t (see FIG. 1) of the lower liquid container 24. In such a case, the liquid to be treated in the lower liquid container 24 flows back into the cyclone 21 when the pressure P22 at the lower liquid port 22c of the cyclone 22 is higher than the pressure P21 at the lower liquid port 21c of the cyclone 21.

When the cyclones 21 and 22 are used as separation means, backflow through the lower liquid port 21c or the lower liquid port 22c means that the liquid to be treated flowing in through the liquid inlets 21a and 22a is simply discharged through the liquid outlet 21b or 22b as a treated liquid. In other words, the liquid to be treated from which aquatic organisms and the like are not separated (not having undergone separation treatment) is conveyed to the treated liquid storage tank 30 as a treated liquid.

The liquid to be treated flowing into the cyclones 21 and 22 has passed through the inactivation device 10, and most of the aquatic organisms and the like are considered to be dead. However, aquatic organisms and the like as large as can be visually observed may be surviving. Consequently, if the liquid to be treated not having undergone separation treatment is stored in the treated liquid storage tank 30 as a treated liquid, the aquatic organisms may proliferate in the treated liquid storage tank 30 while the liquid to be treated is transported as ballast water. Discharging such liquid at the next port of call can cause environment pollution.

In contrast, the air space 24s in the lower liquid container 24 shown in FIGS. 1 and 2(a) prevents the backflow into the cyclones 21 and 22 due to a difference in pressure between the lower liquid ports 21c and 22c of the cyclones 21 and 22. In other words, when the lower liquid container 24 is commonly used for the plurality of cyclones 21 and 22, to secure the air space 24s in the lower liquid container 24 enables an anti-backflow function to prevent the backflow into the cyclones 21 and 22.

The aquatic organisms and the like stored in the lower liquid container 24 are discharged through the drain hole 24e under the lower liquid container 24 to the storage container 26 at regular intervals. Discharge above is performed by opening the valve 25 arranged on the communication member 24p. When the valve 25 is opened, the aquatic organisms and the like in the lower liquid container 24 are discharged into the storage container 26. After the contents of the lower liquid container 24 are discharged, the valve 25 is closed.

After the valve 25 is closed, the flushing pump 27 upstream of the storage container 26 is operated. The flushing pump 27 pumps up the liquid to be treated outside the ship and passes the liquid as flushing water through the storage container 26 toward a downstream direction at high pressure. As a result, the aquatic organisms and the like in the storage container 26 are discharged through the drain pipe 28 to outside the ship through the downstream end 28b. The flushing pump 27 may be omitted since the aquatic organisms and the like in the storage container 26 can be discharged out of the ship without using the flushing pump 27.

Installation of the storage container 26 enables the effect that the hypochlorous acid generated in the inactivation device 10 can be neutralized and the aquatic organisms and the like can be collected and returned to the water. Before discharge of contents of the storage container 26, a neutralizing agent can be applied from the neutralization device 29 to neutralize the hypochlorous acid. Although not shown in the diagrams, the neutralization device 29 and the like may also be provided a after the treated liquid storage tank 30 in a treatment process.

Figure 3:
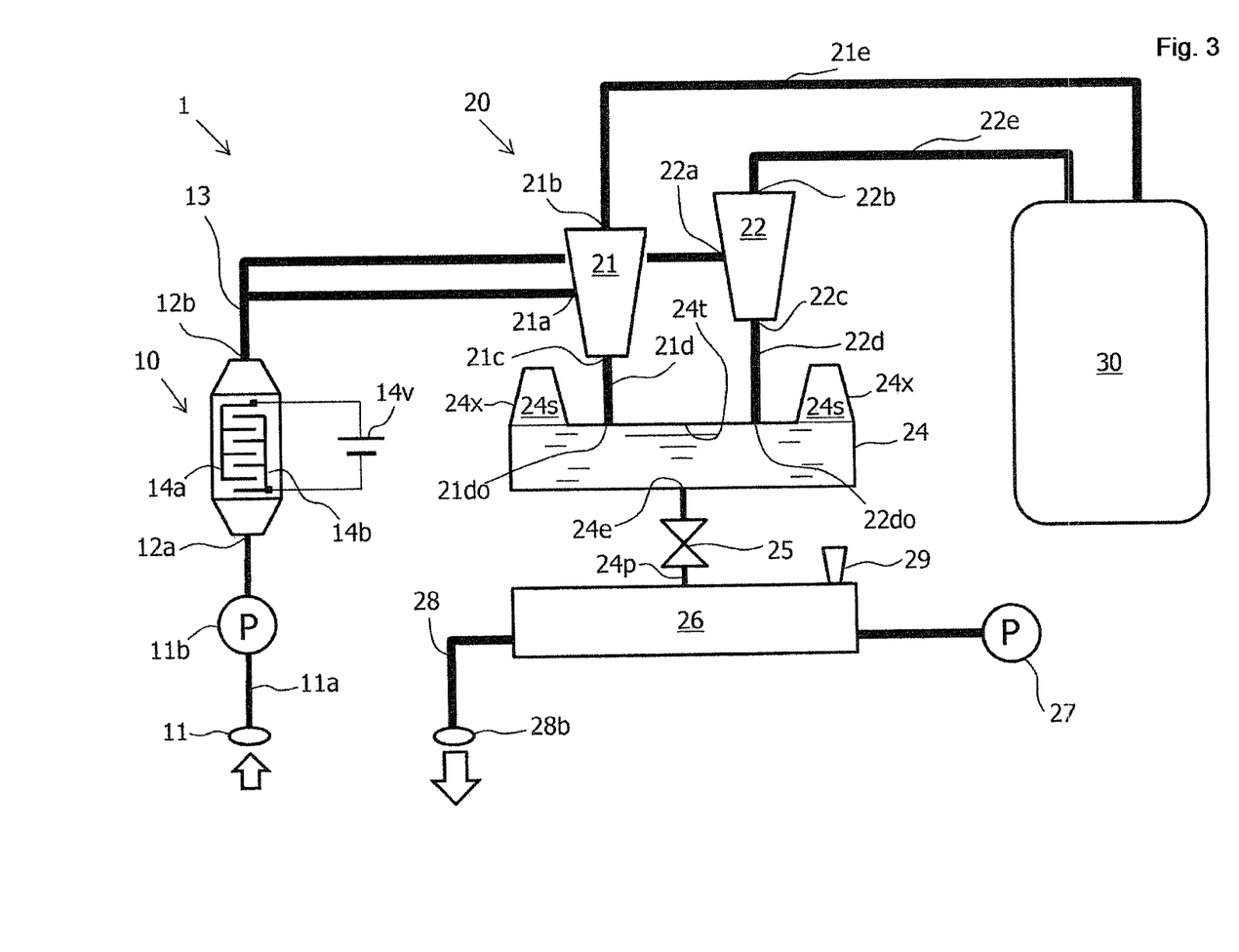
FIG. 3 is a diagram showing another embodiment of the present invention.

FIG. 3 shows another embodiment of the centrifugal solid-liquid separation device 20 according to the present embodiment. The communication opening ends 21do and 22do of the pipes 21d and 22d in the lower tank container 24 are arranged to be flush with the ceiling 24t in the lower liquid container 24. However, the lower liquid container 24 is provided with space forming portions 24x on positions other than those where the pipes 21d and 22d are connected and in areas higher than the communication opening ends 21do and 22do.

As shown in FIG. 3, when the liquid to be treated is stored in this lower liquid container 24, the liquid to be treated accumulates up to the ceiling 24t of the lower liquid container 24. However, the liquid to be treated will not accumulate further. The lower liquid container 24 thus can be configured to have an air space or air spaces 24s in the area higher than the communication opening ends 21do and 22do of the pipes 21d and 22d.

Refer to FIG. 1 again. The space forming portions 24x shown in FIG. 3 can be formed with the communication opening ends 21do and 22do of the pipes 21d and 22d from the cyclones 21 and 22 and the lower liquid container 24, even when the lower liquid container 24 is not made in such a special shape as that of the lower liquid container 24 of FIG. 3.

In other words, when the lower liquid container 24 is configured to be air-tight and the lower communication opening ends 21do and 22do of the pipes 21d and 22d are located below the ceiling 24t of the lower liquid container 24, the air space 24s from the ceiling 24t to the communication opening ends 21do and 22do can be deemed as a space forming portion 24x. That is, the lower liquid container 24 has a space forming portion or portions 24x in the area higher than the communication opening ends 21do and 22do of the pipes 21d and 22d from the cyclones 21 and 22.

Figure 4:
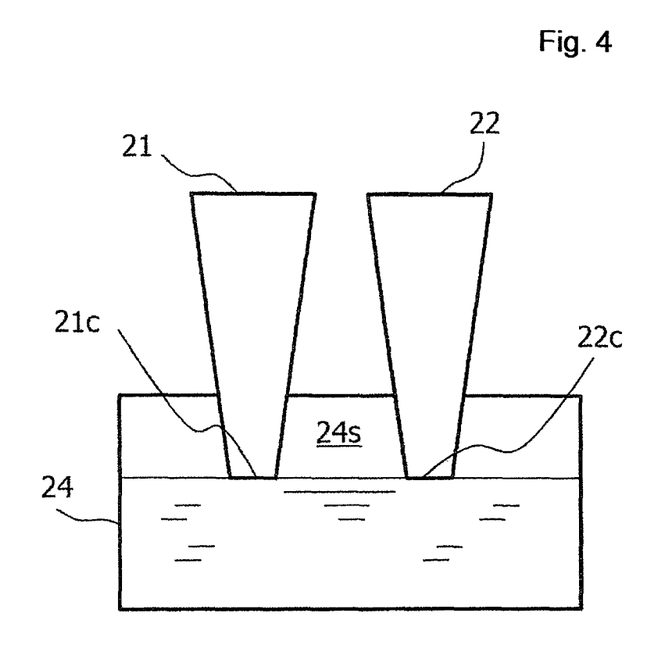
FIG. 4 is a diagram showing another relationship between the cyclones and the lower liquid container.

Communication between the lower liquid container 24 and the cyclones 21 and 22 does not necessarily require the pipes 21d and 22d. FIG. 4 shows a case in which the lower ports 21c and 22c of the cyclones 21 and 22 are directly provided in the lower liquid container 24. In such a case, the lower liquid ports 21c and 22c can be deemed as the communication opening ends 21*do* and 22*do* (see FIG. 3). As in FIG. 4, when the lower liquid ports 21*c* and 22*c* of the cyclones 21 and 22 serve as the communication opening ends 21*do* and 22*do*, height of the centrifugal solid-liquid separation device 20 can be suppressed as much as a length of the pipes 21*d* and 22*d*.

As described above, despite the lower liquid container 24 common to the plurality of cyclones 21 and 22, the water treatment device 1 according to the present embodiment can prevent backflow of separated water into the respective cyclones, with a simple structure and a reduced number of components. In addition, since the storage container 26 is provided on the drain side of the lower liquid container 24, the hypochlorous acid generated in the inactivation device 10 can be neutralized for discharge.

(Embodiment 2)

Figure 5:
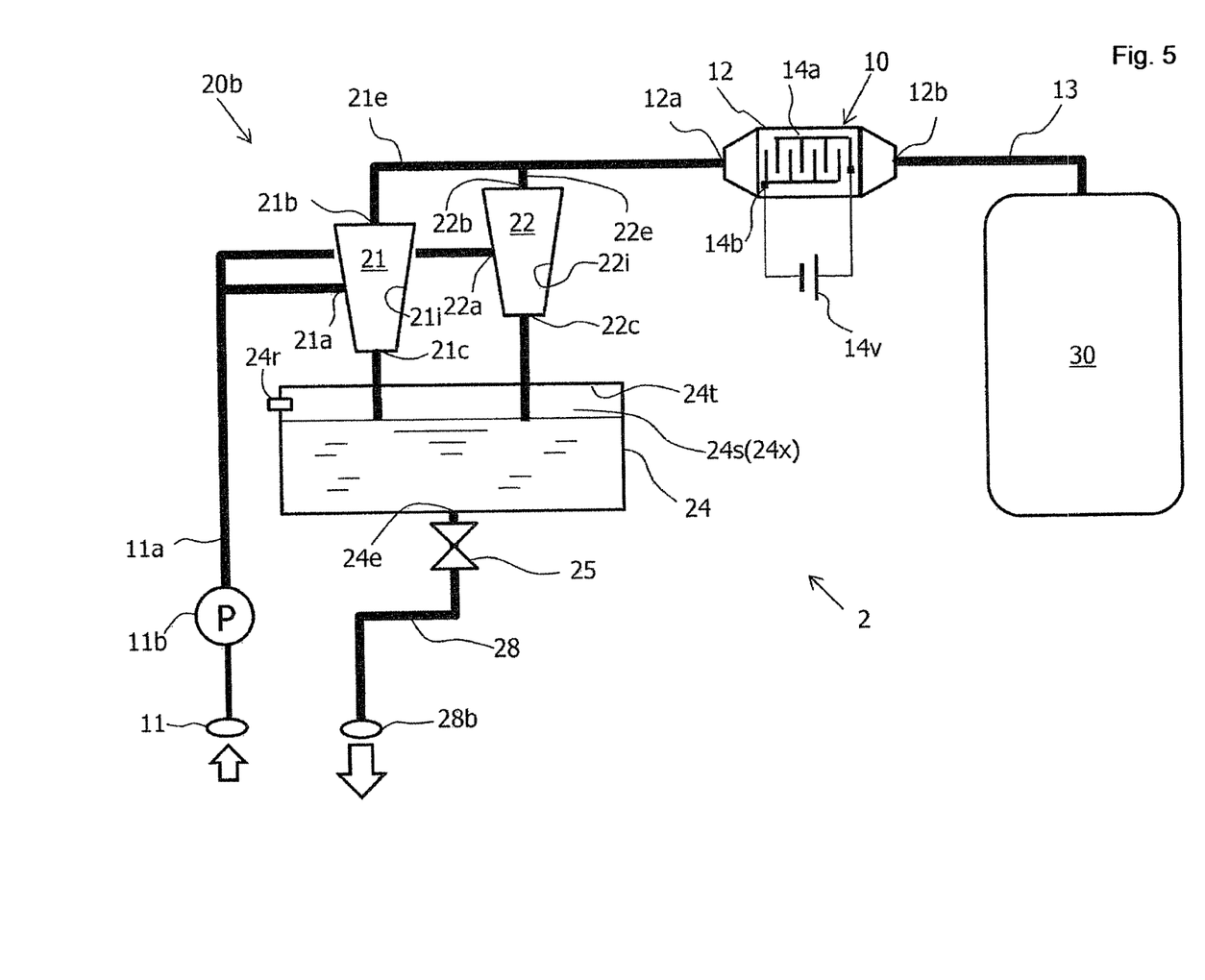
FIG. 5 is a diagram showing an embodiment in which the cyclones and an inactivation device are combined in different order.

FIG. 5 shows a configuration of a water treatment device 2 according to the present embodiment. A description of the same reference signs as those of embodiment 1 will be omitted. In the present embodiment, the water treatment device 2 includes a centrifugal solid-liquid separation device 20*b* and the inactivation device 10. Differences from Embodiment 1 lie in that the inactivation device 10 is arranged after the centrifugal solid-liquid separation device 20*b* in the treatment process, and that the centrifugal solid-liquid separation device 20*b* includes only the cyclones 21 and 22 and the lower liquid container 24 without the storage container 26.

In the water treatment device 2 according to the present embodiment, relatively large aquatic organisms and the like in the liquid to be treated taken in through the water intake port 11 are initially separated before small aquatic organisms and the like are killed by the inactivation device 10. In such a case, the water drained from the centrifugal solid-liquid separation device 20*b* can be simply returned to the water without the addition of a neutralizing agent or the like, because nothing has been added to the liquid to be treated taken in.

This further simplifies the members and saves a required space as compared to the case of Embodiment 1.

As per FIG. 5, the water treatment device 2 includes the centrifugal solid-liquid separation device 20*b* and the inactivation device 10. The treated liquid storage tank 30 may also be included. The water intake pipe 11*a* is extended from the water intake port 11 formed in a surface of the hull. The water intake pipe 11*a* branches off and communicates with the liquid inlets 21*a* and 22*a* of the cyclones 21 and 22. The water intake pump 11*b* is arranged in the water intake pipe 11*a*.

The lower liquid ports 21*c* and 22*c* of the cyclones 21 and 22 communicate with the lower liquid container 24. The drain hole 24*e* of the lower liquid container 24 is connected to the drain pipe 28. The downstream end 28*b* of the drain pipe 28 is a drain port.

The liquid outlets 21*b* and 22*b* of the cyclones 21 and 22 communicate with the water inlet 12*a* of the inactivation device 10 via the pipes 21*e* and 22*e*. The water outlet 12*b* of the inactivation device 10 communicates with the treated liquid storage tank 30 via the pipe 13.

Operation of the water treatment device 2 having the configuration will be described. The liquid to be treated is taken in through the water intake port 11 and conveyed to the cyclones 21 and 22. The cyclones 21 and 22 separate the aquatic organisms and the like depending on a predetermined specific gravity. More specifically, aquatic organisms and the like having the determined specific gravity or more fall into the lower liquid container 24. The liquid to be treated containing aquatic organisms and like having the determined specific gravity or less is conveyed from the liquid outlets 21*b* and 22*b* to the inactivation device 10.

The aquatic organisms and the like in the lower liquid container 24 are returned through the drain port 28*b* to the water area. The aquatic organisms and the like to be returned to the water area at this time are ones existing in the liquid to be treated taken in from that place. The liquid to be treated to be returned to the water along with the aquatic organisms and the like has not passed through the inactivation device 10. Accordingly, even when the liquid is directly returned from the lower liquid container 24 to the water area, the environment not affected. Thus, both the storage container 26 and the neutralization device 29 can be omitted.

In the inactivation device 10, the aquatic organisms and the like in the liquid to be treated are killed by hypochlorous acid generated between the opposed electrodes 14*a* and 14*b*. The liquid to be treated with the aquatic organisms and the like having been killed is stored in the treated liquid storage tank 30 as a treated liquid.

As described above, the water treatment device 2 according to the present embodiment can be constituted only with the centrifugal solid-liquid separation device 20*b* having no storage container 26, the inactivation device 10 and the treated liquid storage tank 30. This allows a simpler configuration than that of the water treatment device 1 of Embodiment 1.

(Embodiment 3)

Figure 6:
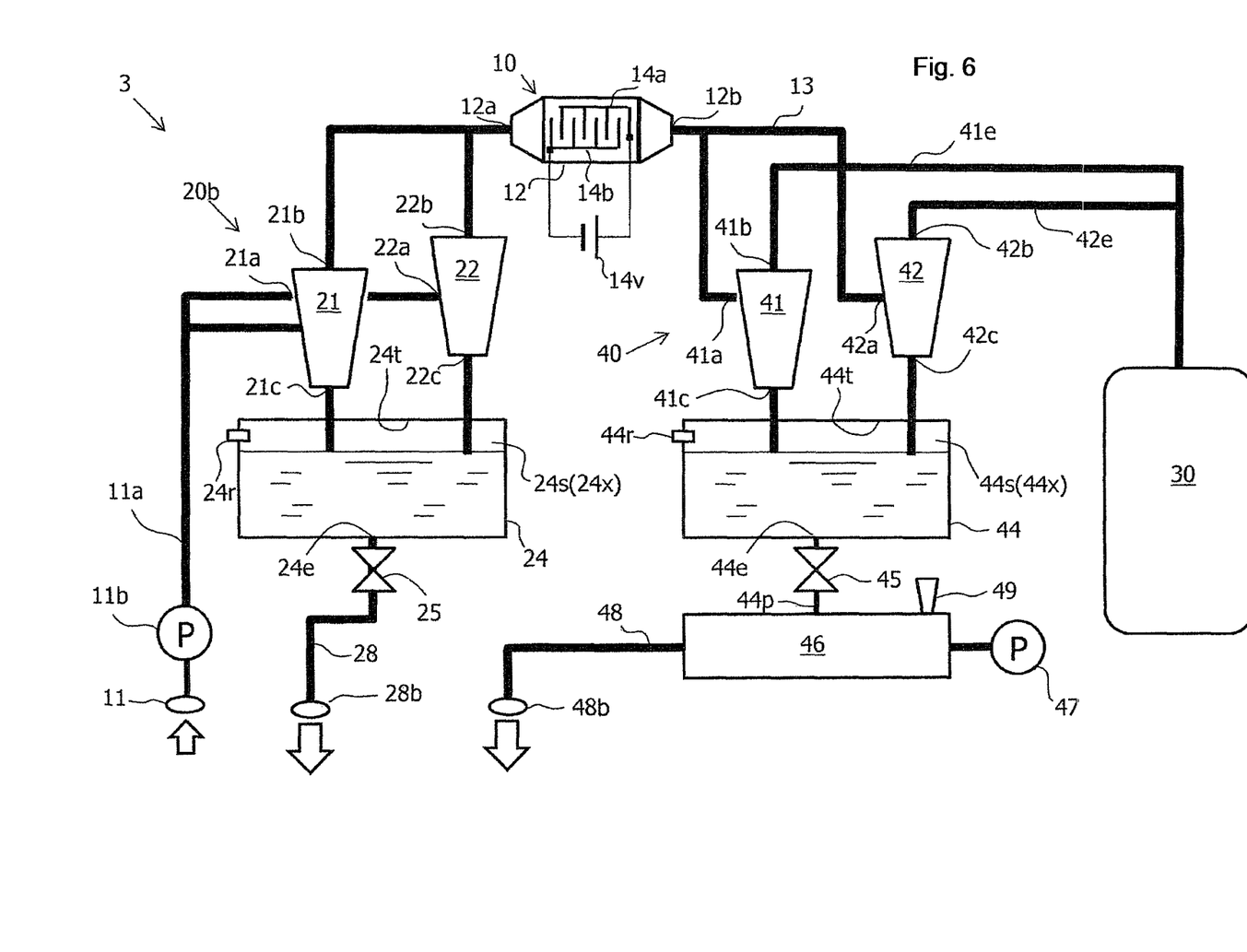
FIG. 6 is a diagram showing an embodiment in which additional cyclones are provided after the cyclones and the inactivation device in the treatment process.

FIG. 6 shows a configuration of a water treatment device 3 according to the present embodiment. A description of the same reference signs as those of embodiment 1 will be omitted. In the present embodiment, the water treatment device 3 includes a centrifugal solid-liquid separation device 20*b*, the inactivation device 10, and a centrifugal solid-liquid separation device 40. Here, an initial centrifugal solid-liquid separation device 20*b* may be referred to as a first centrifugal solid-liquid separation device 20*b*, a next centrifugal solid-liquid separation device 40 maybe referred to as a second centrifugal solid-liquid separation device 40.

The first centrifugal solid-liquid separation device 20*b* is the same as the centrifugal solid-liquid separation device 20*b* according to Embodiment 2. The second centrifugal solid-liquid separation device 40 is the same as the centrifugal solid-liquid separation device 20 according to Embodiment 1, but with different reference signs.

The water treatment device 3 initially separates relatively large aquatic organisms and the like in the liquid to be treated taken in, kills aquatic organisms and the like in the inactivation device 10, and then further separates the aquatic organisms and the like. In the second centrifugal solid-liquid separation device 40, the hypochlorous acid generated by the inactivation device 10 is agitated in cyclones 41 and 42 to be diffused throughout the liquid to be treated so that the aquatic organisms and the like can be more reliably killed.

A storage container 46 of the second centrifugal solid-liquid separation device 40 is provided with a neutralization device 49 to neutralize and discharge the hypochlorous acid generated by the inactivation device 10.

A configuration as well as an operation of the water treatment device 3 will be described below. The liquid to be treated taken in through the water intake port 11 is passed through the water intake pipe 11*a* and put in the cyclones 21 and 22 of the first centrifugal solid-liquid separation device through the liquid inlets 21*a* and 22*a*. Aquatic organisms and the like having predetermined specific gravities are separated according to the sizing characteristics of the cyclones 21 and 22, and precipitate in the lower liquid container 24.

The aquatic organisms and the like in the lower liquid container 24 are discharged through the drain port 28b via the drain pipe 28.

Meanwhile, the liquid to be treated discharged through the liquid outlets 21b and 22b of the cyclones 21 and 22 is directed to the water inlet 12a of the inactivation device 10. The inactivation device 10 applies a voltage between the opposed electrodes 14a and 14b to pass an electric current and thereby generate hypochlorous acid. The liquid to be treated is passed through a space between the opposed electrodes 14a and 14b and exposed to the hypochlorous acid. Aquatic organisms and the like in the liquid to be treated are killed by the hypochlorous acid.

The liquid to be treated discharged from the water outlet 12b of the inactivation device 10 is directed to liquid inlets 41a and 42a of the cyclones 41 and 42 of the second centrifugal solid-liquid separation device 40. The liquid to be treated is strongly agitated in the cyclones 41 and 42, and the aquatic organisms and the like in the liquid to be treated are more reliably exposed to the hypochlorous acid and killed.

Aquatic organisms and the like (mostly dead bodies of the aquatic organisms and the like) separated again according to the sizing characteristics of the cyclones 41 and 42 fall into a lower liquid container 44. The aquatic organism and the like in the lower liquid container 44 are collected in the storage container 46. An air vent 44r may be used in collecting the aquatic organisms and the like in the storage container 46. The hypochlorous acid in the liquid to be treated is neutralized by the neutralization device 49 arranged on the storage container 46. The aquatic organisms and the like in the storage container 46 are discharged out of the ship through a drain port 48b along with the liquid to be treated. The flushing pump 47 may be used for discharge.

The liquid to be treated discharged through the liquid outlets 41b and 42b of the cyclones 41 and 42 is conveyed to the treated liquid storage tank 30 as a treated liquid.

INDUSTRIAL APPLICABILITY

The water treatment device according to the present invention can be suitably used in taking ballast water into the hull. The centrifugal solid-liquid separation device according to the present invention can be widely used as a means for separating the liquid phase.

REFERENCE SIGNS LIST 1, 2, 3 water treatment device
10 inactivation device
11 water intake port
11a water intake pipe
11b water intake pump
12 main body
12a water inlet
12b water outlet
13 pipe
14a, 14b opposed electrode
14v power supply
20 centrifugal solid-liquid separation device
40 second centrifugal solid-liquid separation device
20b (first) centrifugal solid-liquid separation device
21i, 22i inner surface
21c, 22c lower liquid port
21d, 22d pipe
21e, 22e pipe
21do, 22do communication opening end
21, 22 cyclone
21a, 22a liquid inlet
21b, 21b liquid outlet
P21 pressure at the lower liquid port 21c
P22 pressure at the lower liquid port 22c
24 lower liquid container
24e drain hole
24t ceiling
24s air space
24x space forming portion
24p communication member
24r air vent
25 valve
26 storage container
27 flushing pump
28 drain pipe
28b downstream end (drain port)
29 neutralization device
30 treated liquid storage tank
41, 42 cyclone
41a, 42a liquid inlet
41b, 42b liquid outlet
44 lower liquid container
44r air vent
46 storage container
47 flushing pump
49 neutralization device
48b drain port
100 water treatment device
101 seawater intake line
102 rough filtration device
103 pump
104 disinfectant supply device
105 retention tank
106 treated water conveyance line
107 ballast tank
200 centrifugal solid-liquid separation device
202, 204 cyclone
202a, 204a liquid inlet
202b, 204b liquid outlet
202c, 204c lower liquid port
202i inner surface
206, 208 lower liquid container
210, 212 valve
216 flushing pump
218 drain pipe
220 discharge port
240 treated liquid storage tank
214 storage container
230 inactivation device
232 water intake pump

The invention claimed is:

1. A centrifugal solid-liquid separation device comprising:
a plurality of cyclones, each cyclone of the plurality of cyclones having at least a liquid inlet, a liquid outlet, and a lower liquid port; and
a lower liquid container that communicates with the lower liquid ports of each of the plurality of cyclones, wherein
the lower liquid container is provided with an air space above communication opening ends of the respective lower liquid ports of the plurality of cyclones, a liquid level in the lower liquid container extending to the communication opening ends, and the air space extending from the communication opening ends to a top portion of the lower liquid container.

2. The centrifugal solid-liquid separation device according to claim 1, wherein the communication opening ends comprise the respective lower liquid ports.

3. The centrifugal solid-liquid separation device according to claim 1, wherein
the lower liquid container has a drain hole, and
the centrifugal solid-liquid separation device further comprises:
a communication member, one end of the communication member is connected to the drain hole; and
a storage container, the other end of the communication member is connected to the storage container.

4. A water treatment device comprising:
a water intake pipe connected to a water intake port;
an inactivation device with a water inlet connected to the water intake pipe;
a pipe connected to a water outlet of the inactivation device and divided into a plurality of pipes; and
the centrifugal solid-liquid separation device according to claim 3, in which each liquid inlet is connected with one of the plurality of pipes.

5. A water treatment device comprising:
a water intake pipe connected to a water intake port;
the centrifugal solid-liquid separation device according to claim 1, in which each liquid inlet is connected to the water intake pipe; and
an inactivation device with a water inlet connected to the liquid outlets of the plurality of cyclones of the centrifugal solid-liquid separation device.

6. A water treatment device comprising:
a water intake pipe that is connected to a water intake port;
a first centrifugal solid-liquid separation device according to claim 1, in which each liquid inlet is connected to the water intake pipe;
an inactivation device with a water inlet connected to the liquid outlets of the plurality of cyclones of the first centrifugal solid-liquid separation device; and
a second centrifugal solid-liquid separation device comprising:
a plurality of cyclones, each cyclone of the plurality of cyclones of the second centrifugal solid-liquid separation device having at least a liquid inlet, a liquid outlet, and a lower liquid port; and
a lower liquid container that communicates with the lower liquid ports of each of the plurality of cyclones of the second centrifugal solid-liquid separation device, wherein
the lower liquid container is provided with an air space above communication opening ends of the respective lower liquid ports of the plurality of cyclones of the second centrifugal solid-liquid separation device, a liquid level in the lower liquid container extending to the communication opening ends, and the air space extending from the communication opening ends to a top portion of the lower liquid container, and wherein
the lower liquid container has a drain hole, and
the second centrifugal solid-liquid separation device further comprises:
a communication member, one end of the communication member is connected to the drain hole; and
a storage container, the other end of the communication member is connected to the storage container,
wherein each liquid inlet of the plurality of cyclones of the second centrifugal solid-liquid separation device is connected to the water outlet of the inactivation device.

7. The water treatment device according to claim 4, wherein the inactivation device comprises, between the water inlet and the water outlet:
opposed electrodes; and
a power supply that applies a voltage between the opposed electrodes to pass an electric current between the opposed electrodes.

8. The water treatment device according to claim 5, wherein the inactivation device comprises, between the water inlet and the water outlet:
opposed electrodes; and
a power supply that applies a voltage between the opposed electrodes to pass an electric current between the opposed electrodes.

9. The water treatment device according to claim 6, wherein the inactivation device comprises, between the water inlet and the water outlet:
opposed electrodes; and
a power supply that applies a voltage between the opposed electrodes to pass an electric current between the opposed electrodes.

* * * * *